United States Patent
Yao et al.

(10) Patent No.: US 9,690,432 B2
(45) Date of Patent: Jun. 27, 2017

(54) TOUCH RECEIVING CHANNEL RE-USE SCHEME WITH RECEIVER SIGNAL CODING

(71) Applicant: Apple Inc., Cupertino, CA (US)

(72) Inventors: Weijun Yao, San Jose, CA (US); Yingxuan Li, Saratoga, CA (US); Ahmad Al-Dahle, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 14/059,427

(22) Filed: Oct. 21, 2013

(65) Prior Publication Data

US 2015/0109213 A1   Apr. 23, 2015

(51) Int. Cl.
  G09G 1/00   (2006.01)
  G06F 3/044  (2006.01)
  G06F 3/041  (2006.01)

(52) U.S. Cl.
  CPC ............ G06F 3/044 (2013.01); G06F 3/0416 (2013.01)

(58) Field of Classification Search
  CPC .......... G06F 3/041; G06F 3/033; G06F 3/044; G06F 1/00; G06F 3/0416; G06F 3/0418; G06F 3/0412; G09G 1/00
  See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |

(Continued)

FOREIGN PATENT DOCUMENTS

| | | | |
|---|---|---|---|
| JP | 2000-163031 A | 6/2000 | |
| JP | 2002-342033 A | 11/2002 | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Michael Faragalla
(74) *Attorney, Agent, or Firm* — Morrison & Foerster

(57) ABSTRACT

Systems and processes for encoding and decoding touch signals output by a touch sensor are provided. In one example system, switching circuitry can be used to selectively couple each of the sense lines of a touch sensor to a positive terminal or a negative terminal of a sense amplifier based on the values of the elements of a matrix. The touch signals can be amplified and converted into digital form using a single sense amplifier and an ADC before being decoded using decoding circuitry. The decoding circuitry can decode the digital encoded touch signals by multiplying the digital encoded touch signals by each column of an inverse of the matrix used to encode the touch signals. The result of the decoding can be a set of signals that are representative of the touch signals output by the touch sensor.

24 Claims, 9 Drawing Sheets

(56) References Cited

U.S. PATENT DOCUMENTS

| | | |
|---|---|---|
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 8,547,359 B2 | 10/2013 | Souchkov |
| 8,982,091 B1 | 3/2015 | Mohindra |
| 2006/0197753 A1 | 9/2006 | Hotelling |
| 2010/0060591 A1 | 3/2010 | Yousefpor et al. |
| 2010/0060593 A1 | 3/2010 | Krah |
| 2011/0084857 A1 | 4/2011 | Marino et al. |
| 2011/0261006 A1 | 10/2011 | Joharapurkar et al. |
| 2012/0056841 A1 | 3/2012 | Krenik |
| 2012/0086656 A1* | 4/2012 | Hung et al. .................. 345/173 |
| 2012/0105325 A1* | 5/2012 | Brosnan et al. ............. 345/158 |
| 2013/0050130 A1 | 2/2013 | Brown |
| 2014/0145997 A1 | 5/2014 | Tiruvuru |
| 2014/0327644 A1* | 11/2014 | Mohindra ............... G06F 3/044 345/174 |
| 2014/0347122 A1 | 11/2014 | Hong |
| 2015/0091845 A1 | 4/2015 | Park |
| 2015/0109212 A1 | 4/2015 | Yao et al. |
| 2015/0338952 A1 | 11/2015 | Shahparnia |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Sep. 25, 2015, for U.S. Appl. No. 14/059,411, filed Oct. 21, 2013, 13 pages.

Final Office Action mailed May 9, 2016, for U.S. Appl. No. 14/059,411, filed Oct. 21, 2013, 13 pages.

Non-Final Office Action mailed Feb. 22, 2016, for U.S. Appl. No. 14/286,949, filed May 23, 2014, 15 pages.

Final Office Action mailed Sep. 28, 2016, for U.S. Appl. No. 14/286,949, filed May 23, 2014, 17 pages.

Non-Final Office Action mailed Oct. 3, 2016, for U.S. Appl. No. 14/059,411, filed Oct. 21, 2013, five pages.

* cited by examiner

Encoding
400

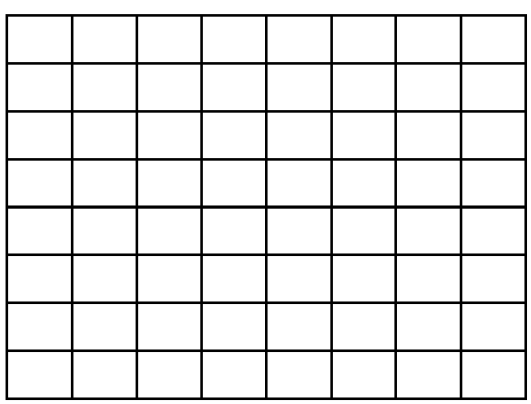
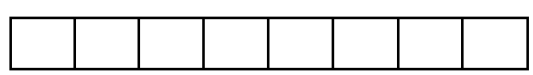
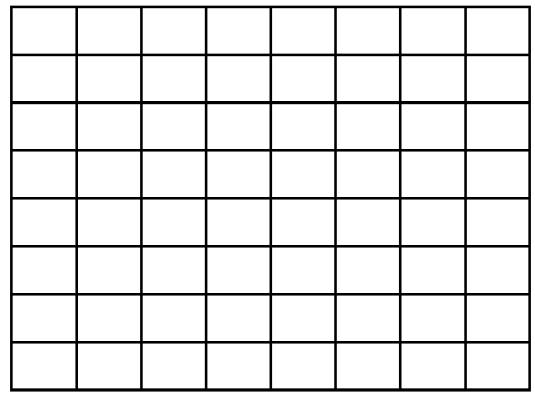
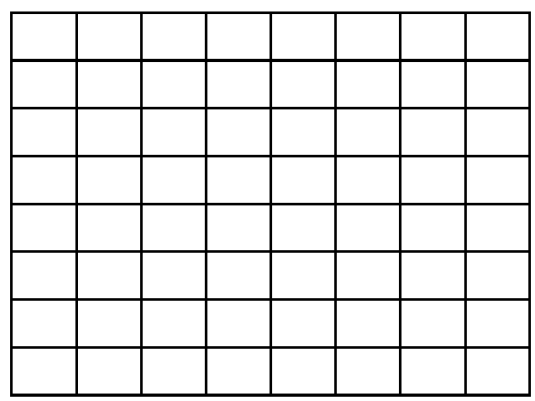
FIG. 5
Decoding 500

Personal Device 800

Personal Device 900

Personal Device 1100

Personal Device 1000

TOUCH RECEIVING CHANNEL RE-USE SCHEME WITH RECEIVER SIGNAL CODING

FIELD

This relates generally to touch sensitive devices and, more specifically, to encoding touch signals output by a touch sensor of a touch sensitive device.

BACKGROUND

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

Some touch sensor panels can include an array of touch regions or nodes formed at the crossing points between rows of drive lines and columns of sense lines. To sense a touch at the touch sensor, the drive lines can be driven by alternating current (AC) stimulation signals to capacitively couple with the crossing sense lines, thereby forming a capacitive path for coupling charge from the drive lines to the sense lines. The crossing sense lines can output touch signals representing the coupled charge or current. Typical touch sensitive devices can include separate receiver circuitry coupled to each sense line of the touch sensor for receiving and processing the touch signals. While this configuration can be used to effectively process the touch signals, the receiver circuitry can consume a large amount of power and occupy a large amount of space on the receiver chip within the touch sensitive device.

SUMMARY

Systems and processes for encoding and decoding touch signals output by a touch sensor are provided. In one example system, switching circuitry can be used to selectively couple each of the sense lines of a touch sensor to a positive terminal or a negative terminal of a sense amplifier based on the values of the elements of a matrix. The touch signals can be amplified and converted into digital form using a single sense amplifier and an ADC before being decoded using decoding circuitry. The decoding circuitry can decode the digital encoded touch signals by multiplying the digital encoded touch signals by each column of an inverse of the matrix used to encode the touch signals. The result of the decoding can be a set of signals that are representative of the touch signals output by the touch sensor.

BRIEF DESCRIPTION OF THE DRAWINGS

FIG. 4 illustrates an example encoding of touch signals output by a touch sensor according to various examples.

FIG. 5 illustrates an example decoding of touch signals output by a touch sensor according to various examples.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to systems and processes for encoding and decoding touch signals output by a touch sensor. In one example system, switching circuitry can be used to selectively couple each of the sense lines of a touch sensor to a positive terminal or a negative terminal of a sense amplifier based on the values of the elements of a matrix. The touch signals can be amplified and converted into digital form using a single sense amplifier and an ADC before being decoded using decoding circuitry. The decoding circuitry can decode the digital encoded touch signals by multiplying the digital encoded touch signals by each column of an inverse of the matrix used to encode the touch signals. The result of the decoding can be a set of signals that are representative of the touch signals output by the touch sensor.

Figure 1:
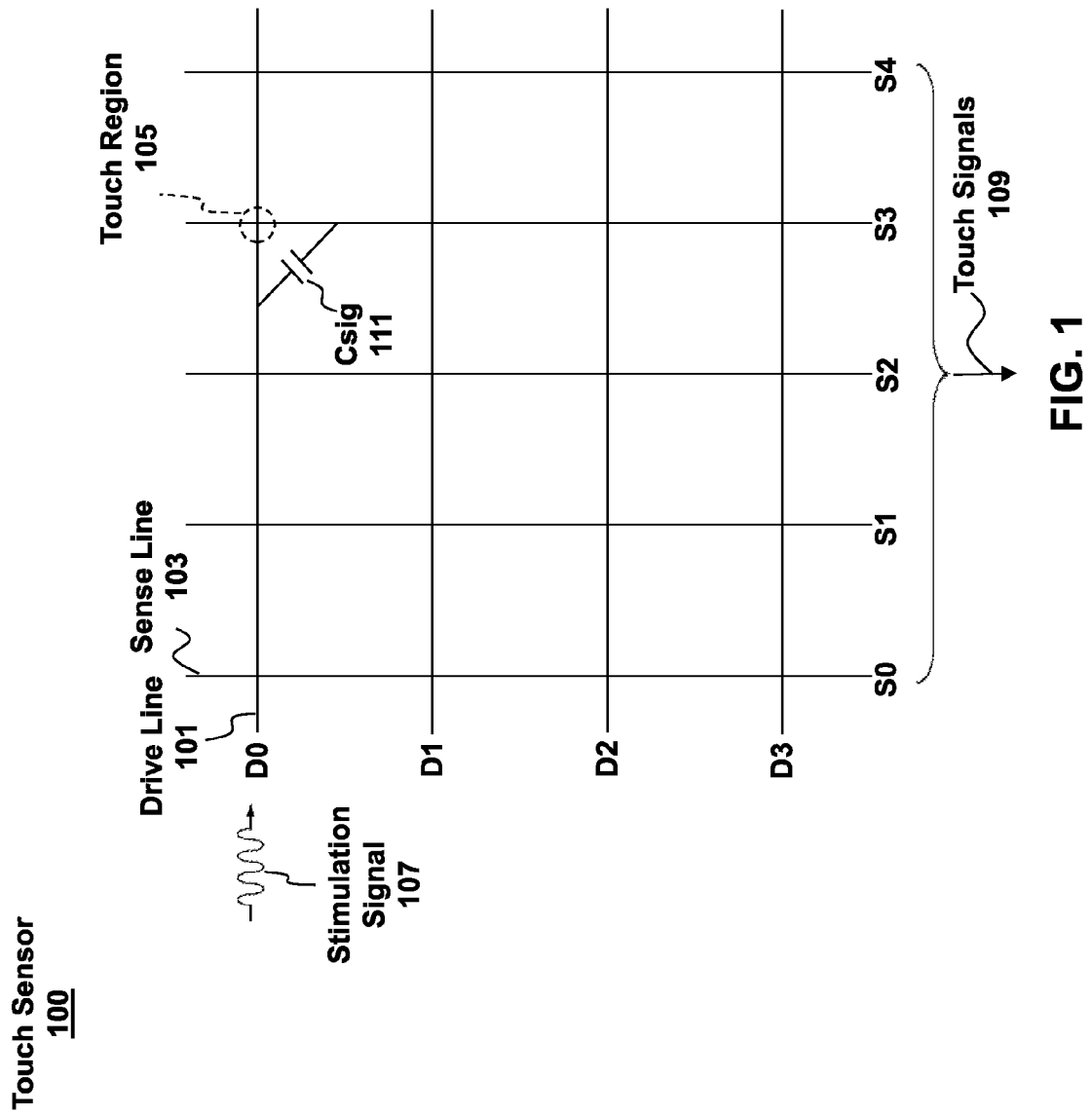
FIG. 1 illustrates an exemplary touch sensor that can be used with a touch sensitive device according to various examples.

FIG. 1 illustrates touch sensor 100 that can be used to detect touch events on a touch sensitive device, such as a mobile phone, tablet, touchpad, portable or desktop computer, portable media player, or the like. Touch sensor 100 can include an array of touch regions or nodes 105 that can be formed at the crossing points between rows of drive lines 101 (D0-D3) and columns of sense lines 103 (S0-S4), although it should be understood that the row/drive line and column/sense line associations are only exemplary. Each touch region 105 can have an associated mutual capacitance Csig 111 formed between the crossing drive lines 101 and sense lines 103 when the drive lines are stimulated. The drive lines 101 can be stimulated by stimulation signals 107 provided by drive circuitry (not shown) and can include an alternating current (AC) waveform. The sense lines 103 can transmit touch signals 109 indicative of a touch at the touch sensor 100 to sense circuitry (not shown), which can include a sense amplifier for each sense line, or a fewer number of sense amplifiers that can be multiplexed to connect to a larger number of sense lines.

To sense a touch at the touch sensor 100, drive lines 101 can be stimulated by the stimulation signals 107 to capacitively couple with the crossing sense lines 103, thereby forming a capacitive path for coupling charge from the drive lines 101 to the sense lines 103. The crossing sense lines 103 can output touch signals 109, representing the coupled charge or current. When an object, such as a passive stylus, finger, etc., touches the touch sensor 100, the object can cause the capacitance Csig 111 to reduce by an amount ΔCsig at the touch location. This capacitance change ΔCsig can be caused by charge or current from the stimulated drive line 101 being shunted through the touching object to ground rather than being coupled to the crossing sense line 103 at the touch location. The touch signals 109 representative of the capacitance change ΔCsig can be received by the sense lines 103 and transmitted to the sense circuitry for processing. The touch signals 109 can indicate the touch region where the touch occurred and the amount of touch that occurred at that touch region location.

While the example shown in FIG. 1 includes four drive lines 101 and five sense lines 103, it should be appreciated that touch sensor 100 can include any number of drive lines 101 and any number of sense lines 103 to form the desired number and pattern of touch regions 105. Additionally, while the drive lines 101 and sense lines 103 are shown in FIG. 1 in a crossing configuration, it should be appreciated that other configurations are also possible to form the desired touch region pattern. While FIG. 1 illustrates mutual capacitance touch sensing, other touch sensing technologies may also be used in conjunction with examples of the disclosure, such as self-capacitance touch sensing, resistive touch sensing, projection scan touch sensing, and the like. Furthermore, while various examples describe a sensed touch, it should be appreciated that the touch sensor 100 can also sense a hovering object and generate hover signals therefrom.

As mentioned above, in some examples, the sense lines 103 can transmit touch signals 109 indicative of a touch at the touch sensor 100 to sense circuitry (not shown). The sense circuitry can typically include a sense amplifier coupled to each sense line and an analog-to-digital converter (ADC) coupled to each sense amplifier. Such a configuration can result in the sense circuitry consuming a large amount of power and occupying a large amount of space on the receiver chip.

Figure 2:
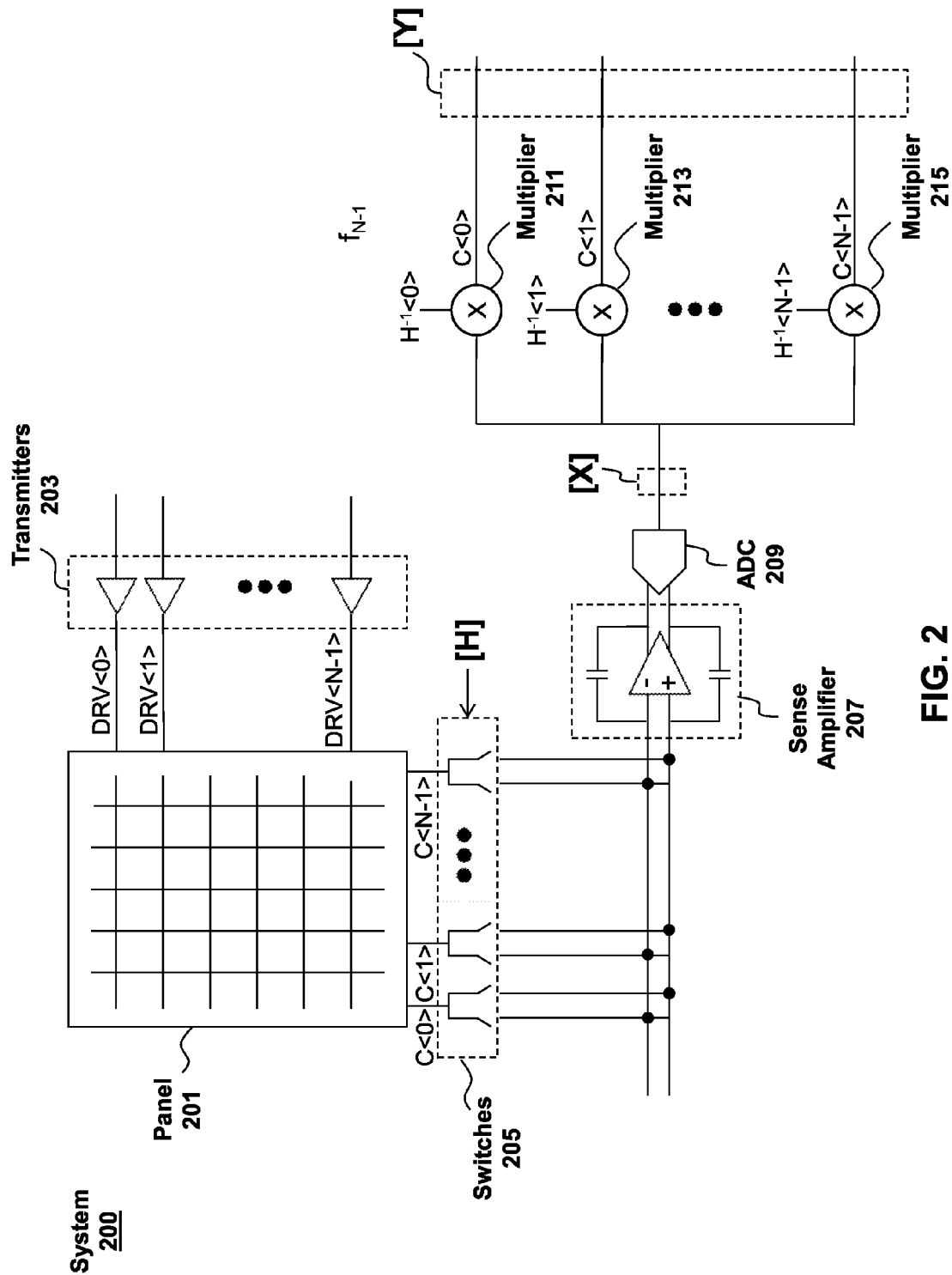
FIG. 2 illustrates a block diagram of an exemplary system for encoding and decoding touch signals output by a touch sensor according to various examples.

To reduce the number of components within the sense circuitry, an encoding scheme can be applied to the touch signals. FIG. 2 illustrates a block diagram of an exemplary system 200 for encoding and decoding touch signals output by a touch sensor according to various examples.

System 200 can include a touch sensor panel 201 similar or identical to touch sensor 100. Touch sensor panel 201 can include any number of drive lines or electrodes and sense lines or electrodes arranged in any desired configuration. System 200 can further include drive circuitry (including transmitters 203) for generating stimulation signals for stimulating the drive lines. Any desired stimulation technique can be used, such as a single-stim (SS) technique in which only one drive line is stimulated at a time, a multi-stim (MS) technique in which multiple drive lines are stimulated at the same time using stimulation signals with the same frequency, an orthogonal frequency scan (OFS) technique described in the concurrently filed U.S. patent application entitled "ORTHOGONAL FREQUENCY SCAN SCHEME IN TOUCH SYSTEM," by Yao et al. (Ser. No. 14/059,411) in which some or all of the drive lines are stimulated with stimulation signals having orthogonal frequencies (e.g., frequencies separated by a frequency that is inversely proportional to an integration time of the touch panel), or the like.

System 200 can further include sense circuitry coupled to receive touch signals from each of the sense lines of panel 201. The sense circuitry can include switching circuitry containing a set of switches 205 operable to selectively couple each of the sense lines of panel 201 to either the positive or negative input terminal of sense amplifier 207. While not shown, it should be appreciated that switches 205 can include a number of switches equal to the number of sense lines in panel 201, with one switch coupled to each sense line. As will be described in greater detail below, switches 205 can be used to encode the touch signals output by panel 201 using a matrix H.

The sense circuitry can further include ADC 209 coupled to convert the analog output of sense amplifier 207 into a digital signal and decoding circuitry including a set of multipliers 211, 213, and 215 coupled to receive the digital output of ADC 209. While only three multipliers are shown, it should be appreciated that the sense circuitry can include a number of multipliers equal to the number of sense lines in panel 201, where each multiplier can be operable to multiply the received signal by a portion of the inverse of the matrix H used to encode the touch signals from panel 201. In this way, the multipliers can decode the touch signals that were encoded by switches 205. The output of multipliers 211, 213, and 215 can be signals that are representative of the touch signals output by panel 201.

By encoding and decoding the touch signals using switches 205 and multipliers 211, 213, and 215, a single sense amplifier (e.g., sense amplifier 207) and a single ADC (e.g., ADC 209) can be used for all receiver channels, regardless of the number of sense lines in the touch panel. This advantageously reduces the power consumed and space on the receiver chip required by the sense circuitry. Typically, the sense amplifiers and ADCs are the components that consume the most power in the receiver channels.

While not shown, it should be appreciated that system 200 can further include additional circuitry for performing other encoding or decoding functions. For example, system 200 can further include additional drive circuitry for encoding the stimulation signals (e.g., with different phases, frequencies, or a combination thereof) prior to the stimulation signals being provided to transmitters 203. Additionally, system 200 can further include demodulation circuitry coupled to the outputs of multipliers 211, 213, and 215 for demodulating the received signals based on the encoding performed on the stimulation signals by the additional drive circuitry.

Figure 3:
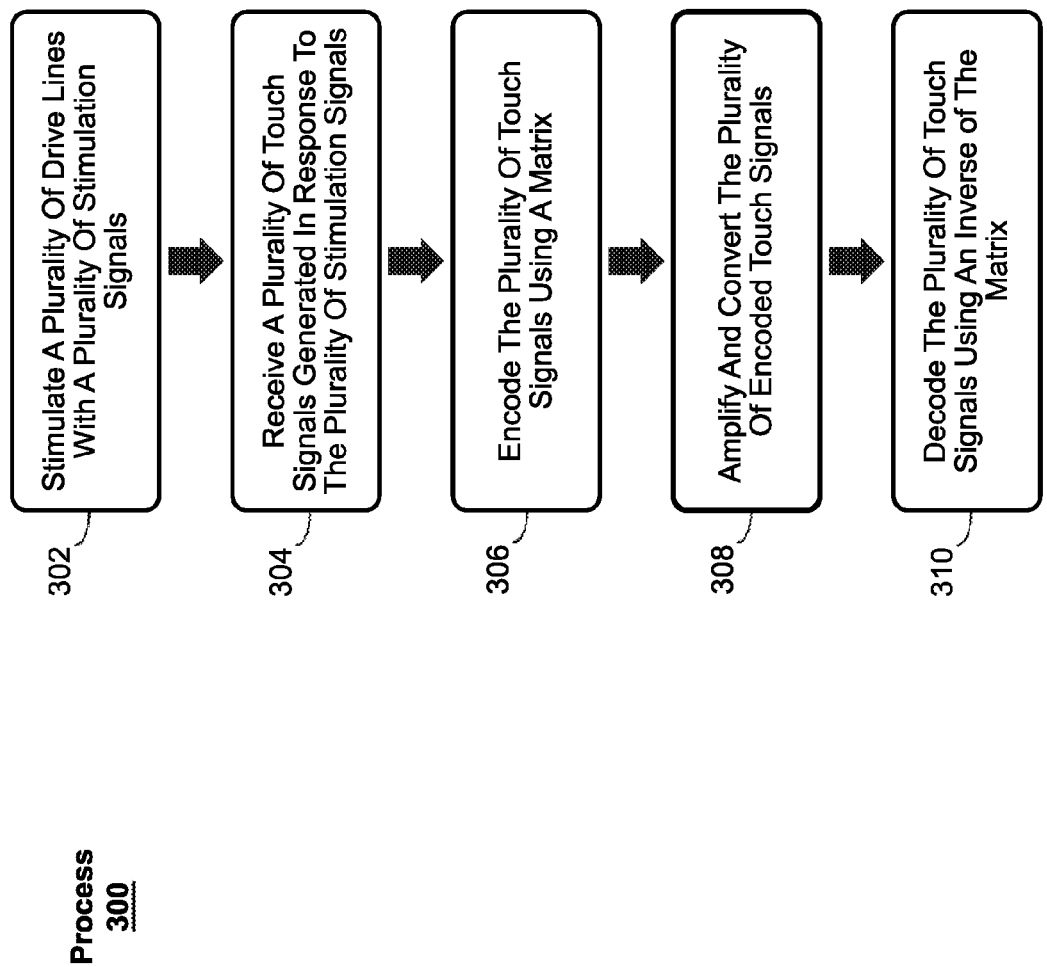
FIG. 3 illustrates an exemplary process for encoding and decoding touch signals output by a touch sensor according to various examples.

FIG. 3 illustrates an example process 300 for encoding and decoding touch signals output by a touch sensor according to various examples. Process 300 can be performed by a system similar or identical to that shown in FIG. 2.

At block 302, the drive lines of a touch sensor panel, such as touch sensor panel 201, can be driven with stimulation signals, such as stimulation signals 107, by drive circuitry having transmitters similar or identical to transmitters 203. The stimulation signals can be generated using any desired stimulation technique, such as a SS technique in which only one drive line is stimulated at a time, a MS technique in which multiple drive lines are stimulated at the same time using stimulation signals with the same frequency, an OFS technique in which some or all of the drive lines are stimulated with stimulation signals having orthogonal frequencies (e.g., frequencies separated by a frequency that is inversely proportional to an integration time of the touch panel), or the like. To illustrate, FIG. 2 shows the N drive lines of panel 201 being driven with N stimulation signals DRV provided by N transmitters 203.

Referring back to FIG. 3, at block 304, a plurality of touch signals that were generated in response to the plurality of stimulation signals used to stimulate the plurality of drive lines at block 302 can be received. The touch signals can be similar or identical to touch signals 109 discussed above. The touch signals can be received by sense circuitry that includes a set of switches similar or identical to switches 205. The switches can include a switch coupled to each of the sense lines of the touch panel. To illustrate, FIG. 2 shows the set of N switches 205 coupled to receive the N touch signals C from panel 201. While the number of drive lines and sense lines are the same in the example shown in FIG. 2, it should be appreciated that the touch sensor panel can include any number of drive lines and sense lines.

At block 306, the plurality of touch signals received at block 304 can be encoded using a matrix. The touch signals can be encoded using a set of switches similar or identical to switches 205 by selectively coupling the sense lines (and thus, touch signals output by the sense lines) of the touch panel to either a positive or negative terminal of a sense amplifier similar or identical to sense amplifier 207. The switches can couple the sense lines to the positive or negative terminal of the sense amplifier based on the values of the elements of the matrix. For example, a matrix value of "1" can indicate that the switch should couple its associated sense line to the negative terminal of the sense amplifier, while value of "0" or "−1" can indicate that the switch should couple its associated sense line to the positive terminal of the sense amplifier (or vice versa). In some examples, the matrix used to encode the touch signals can include a Hadamard Matrix, Circulant Matrix, Identity Matrix, or the like. The matrix can include a number of rows corresponding to the number of drive lines of the touch sensor panel and a number of columns corresponding to the number of sense lines of the touch sensor panel.

Figure 4:
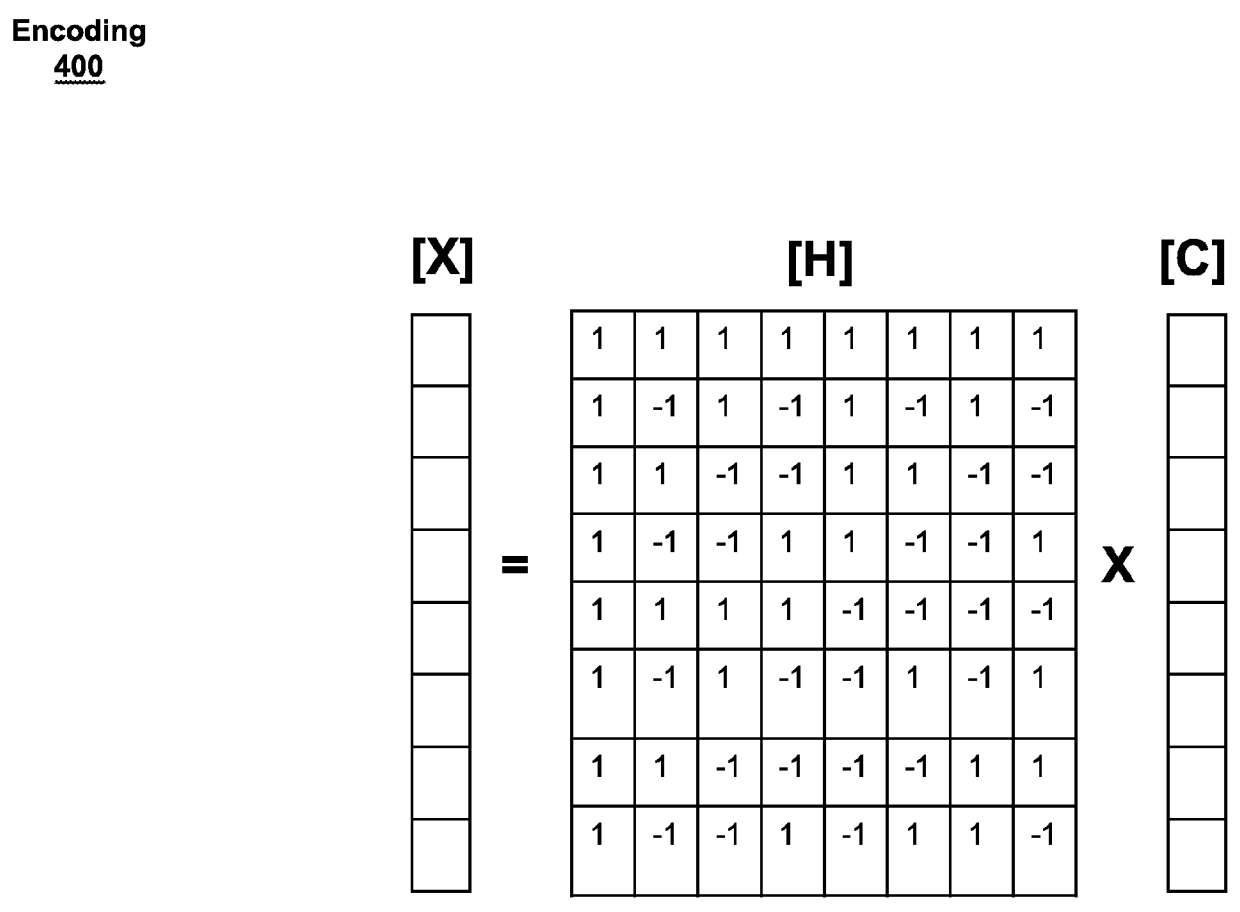

To illustrate, FIG. 2 shows the set of N switches 205 coupled to receive the N touch signals C from panel 201. Since panel 201 also includes N drive lines, a matrix having N columns and N rows can be used to encode the set of N touch signals C. FIG. 4 illustrates an example encoding 400 and matrix H that can be used to encode the N touch signals C, where N, in this example, is equal to eight. As shown, the encoding matrix H is an 8×8 Hadamard Matrix, the vector C includes the N touch signals (e.g., $C<0>$, $C<1>$, . . . $C<7>$), and X is the product of matrix H and vector C. The touch signals C can be encoded using the encoding matrix H by multiplying the touch signals C by the encoding matrix H. This can be accomplished by using switches 205 to selectively couple certain sense lines (and thus, certain touch signals) to either the positive or negative terminal of sense amplifier 207. In some examples, a value of "1" in the encoding matrix H can indicate that the switch should couple its associated sense line to the negative terminal of the sense amplifier, while value of "−1" in the encoding matrix can indicate that the switch should couple its associated sense line to the positive terminal of the sense amplifier. Thus, using the example matrix H shown in FIG. 4, during a first encoding period, each switch 205 can couple its associated sense line to the negative terminal of sense amplifier 207 since each element of the first row of the encoding matrix H has a value of "1." During a second encoding period, switches 205 can be operable to cause touch signal $C<0>$ to be coupled to the negative terminal of sense amplifier 207, touch signal $C<1>$ to be coupled to the positive terminal of sense amplifier 207, touch signal $C<2>$ to be coupled to the negative terminal of sense amplifier 207, touch signal $C<3>$ to be coupled to the positive terminal of sense amplifier 207, touch signal $C<4>$ to be coupled to the negative terminal of sense amplifier 207, touch signal $C<5>$ to be coupled to the positive terminal of sense amplifier 207, touch signal $C<6>$ to be coupled to the negative terminal of sense amplifier 207, and touch signal $C<7>$ to be coupled to the positive terminal of sense amplifier 207 since the second row of the encoding matrix H contains the values (1, −1, 1, −1, 1, −1, 1, −1). This process of selectively coupling the sense lines (and touch signals) to the positive or negative terminal of sense amplifier 207 based on the encoding matrix can continue for each row of the encoding matrix. The process can then repeat again from the first row of the encoding matrix. Each encoding period can be of any length of time, which can be the same or different than those of other encoding periods.

Referring back to FIG. 3, at block 308, the encoded signals can be amplified and converted into a digital signal. A sense amplifier similar or identical to sense amplifier 207 can be used to amplify the encoded signals and an ADC similar or identical to ADC 209 can be used to convert the analog amplified signal into a digital signal. The output of the ADC can be a digital signal representation of the encoded touch signals generated at block 306.

To illustrate, FIG. 2 shows sense amplifier 207 coupled to receive the encoded touch signals from switches 205. The output of sense amplifier 207 can be coupled to ADC 209, which is operable to convert the analog output of sense amplifier 207 into a digital signal. The digital signal output by ADC 209 can include a digital signal representation X of the encoded touch signals generated by switches 205. As shown in FIG. 4, X is a vector representing the product of the encoding matrix H multiplied by the vector C representing the touch signals from panel 201.

Referring back to FIG. 3, at block 310, the (digital) encoded touch signals can be decoded using an inverse of the matrix used to encode the touch signals at block 306. This can include multiplying the encoded signals by the columns of the inverse of the matrix H used to encode the touch signals using multipliers similar or identical to multipliers 211, 213, and 215. The signals output by the multipliers can represent the touch signals received from the sense lines of the touch panel.

To illustrate, FIG. 2 shows multipliers 211, 213, and 215 coupled to receive the digital signal X from ADC 209. While not shown, system 200 can include eight multipliers to decode digital signal X to obtain the eight touch signals received from the eight sense lines of panel 201. As shown, each multiplier can be configured to multiply the encoded digital signal X by a column of the inverse of the matrix H used to encode the touch signals. For example, multiplier 211 can be configured to multiply encoded digital signal X by column "0" of inverse matrix $H^{-1}$, which can be the inverse matrix of matrix H. The signal output by multiplier 211 can represent the touch signal $C<0>$ received from the first sense line of panel 201. Similarly, multiplier 213 can be configured to multiply encoded digital signal X by column "1" of inverse matrix $H^{-1}$. The signal output by multiplier 213 can represent the touch signal $C<1>$ received from the second sense line of panel 201. Multipliers corresponding to each touch signal received from panel 201 can similarly be used to decode the encoded digital signal X to obtain signals representing the touch signals received from panel 201. FIG. 5 shows an example decoding 500 that can be used to decode the encoded digital signal X. As shown, vector Y (output by multipliers 211, 213, and 215 in FIG. 2) represents the product of inverse matrix $H^{-1}$ multiplied by encoded digital signal X. Since X is the product of touch signals C multiplied by encoding matrix H, the result of inverse matrix $H^{-1}$ being multiplied by encoded digital signal X is the original set of touch signals C.

It should be appreciated that process 300 can be preceded or followed by additional operations. For example, the stimulation signals provided to the drive lines of the touch sensor panel can be encoded (e.g., with different phases, frequencies, or a combination thereof) prior to block 302 of process 300. In these examples, an additional demodulation operation can also be performed after block 310 of process 300. For instance, the output Y generated by multipliers 211, 213, and 215 in FIG. 2 can subsequently be demodulated by multiplying the signals by a matrix and/or signals having select frequencies based on the encoding performed on the stimulation signals prior to block 302.

Using process 300, the number of components within the sense circuitry can advantageously be reduced, thereby reducing the power and space on the receiver chip required by the sense circuitry. In particular, the number of sense amplifiers and ADCs can be reduced since a single sense amplifier and a single ADC can be used for all receiver channels, regardless of the number of sense lines in the touch panel. Typically, these are the components that consume the most power in the receiver channels.

Figure 6:
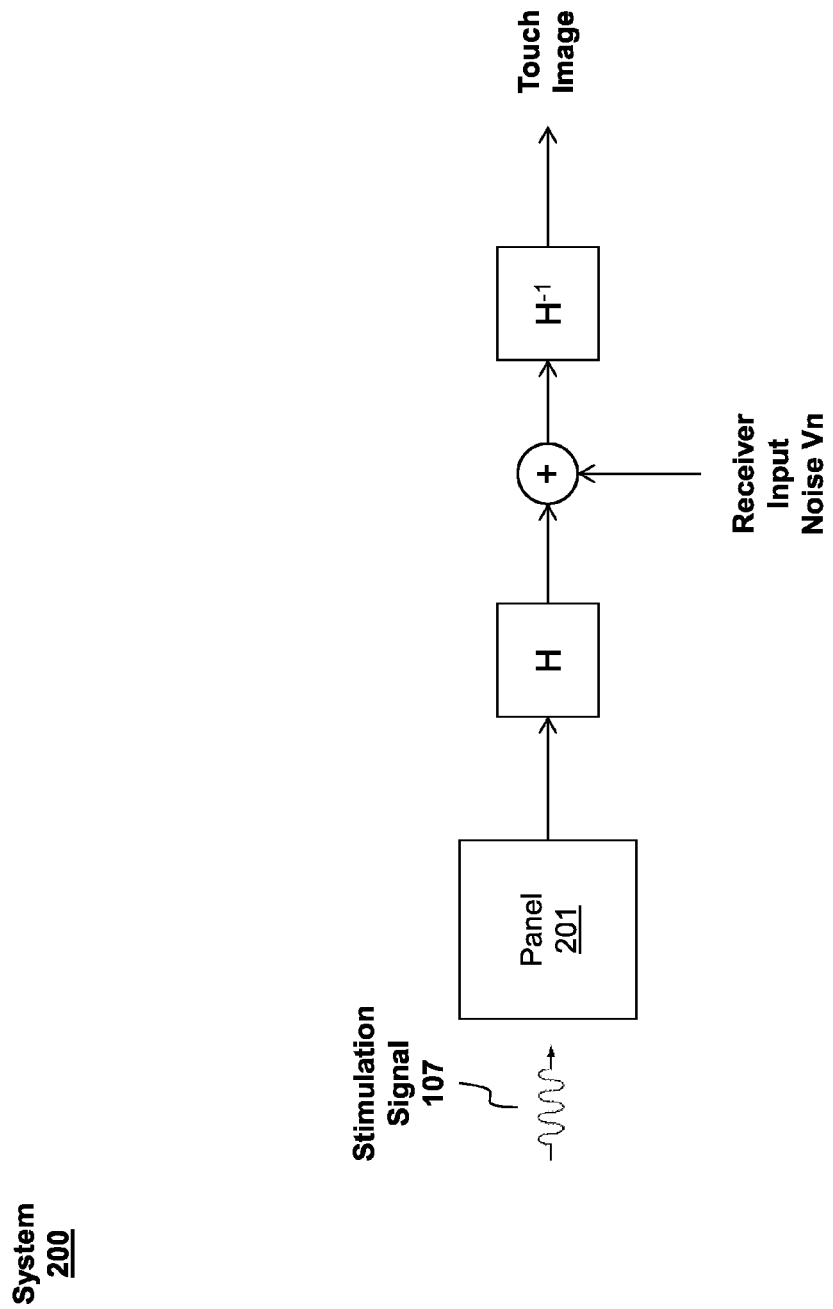
FIG. 6 illustrates a simplified block diagram of a noise model of the system shown in FIG. 2.

Moreover, using process 300 can reduce the receiver input noise Vn. To illustrate, FIG. 6 shows a simplified block diagram of a noise model of system 200. As shown, panel 201 can be coupled to receive stimulation signals, such as stimulation signals 107, from drive circuitry (not shown) having transmitters similar or identical to transmitters 203. Panel 201 can output touch signals that can be encoded using matrix H. Receiver input noise Vn can be added to the encoded output of matrix H from various receiver circuitry, such as sense amplifier 207, ADC 209, and the like. The encoded touch signals and receiver input noise Vn can then be decoded using the inverse matrix $H^{-1}$, the output of which can be the touch signals used for detecting touch or hover events associated with panel 201. Thus, the receiver noise Vn can be scaled by $H^{-1}$ or, in other words, can be quantitatively scaled by the Eigenvalue of $H^{-1}$. In the example where H is the Hadamard matrix, the receiver noise Vn can be scaled by the square root of N, where N is the size of matrix H. Since the noise to signal ratio can be proportional to the square root of the size N of the Hadamard matrix, using process 300 can reduce the receiver input noise Vn.

Figure 7:
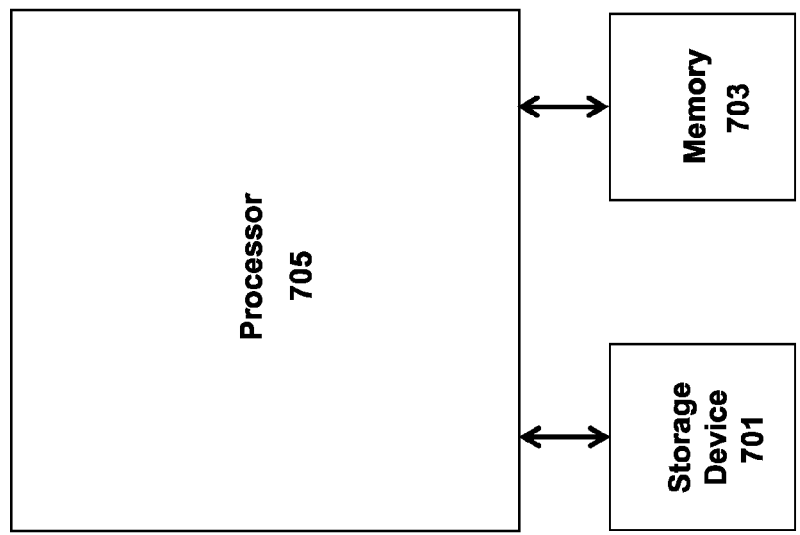
FIG. 7 illustrates an exemplary system for encoding and decoding touch signals output by a touch sensor according to various examples.

One or more of the functions relating to the encoding and decoding of touch signals output by a touch sensor as described above can be performed by a system similar or identical to system 700 shown in FIG. 7. System 700 can include instructions stored in a non-transitory computer readable storage medium, such as memory 703 or storage device 701, and executed by processor 705. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the system is not limited to the components and configuration of FIG. 7, but can include other or additional components in multiple configurations according to various examples. Additionally, the components of system 700 can be included within a single device, or can be distributed between multiple devices.

Figure 8:
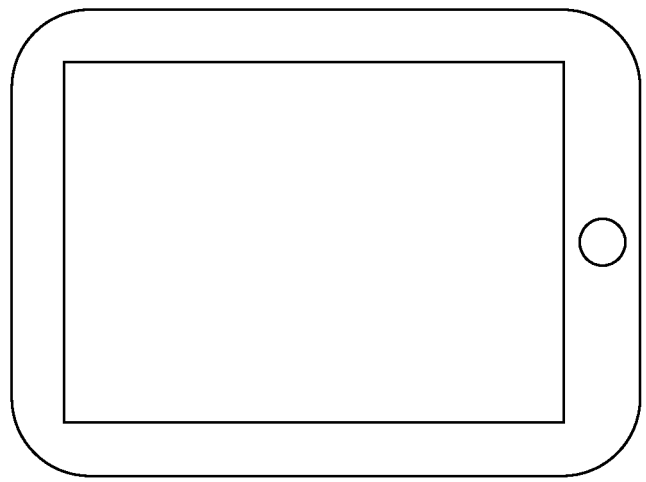
FIGS. 8-11 illustrate exemplary personal devices that can include a touch sensor having encoded and decoded touch signals according to various examples.
Figure 9:
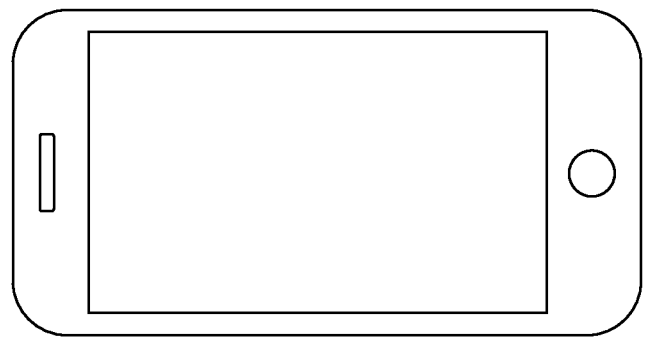
Figure 11:
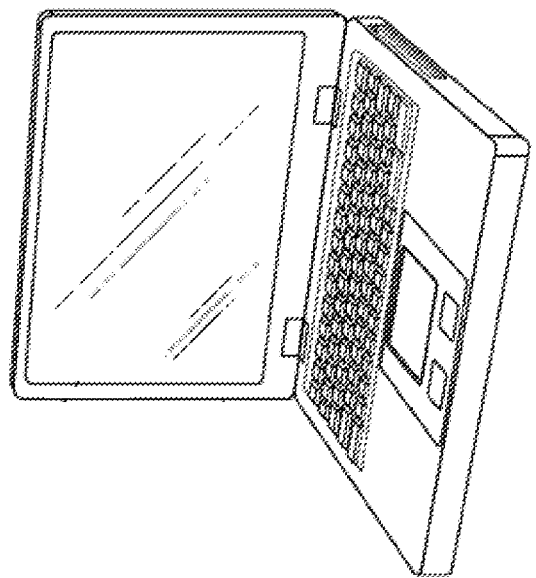
Figure 10:
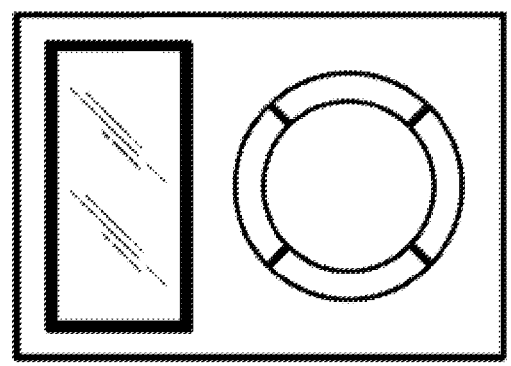

FIGS. 8-11 show example systems in which a touch sensor having encoded and decoded touch signals according to examples of the disclosure may be implemented. FIG. 8 illustrates an exemplary personal device 800, such as a tablet, that can be used with a touch sensor having encoded and decoded touch signals according to various examples. FIG. 9 illustrates another exemplary personal device 900, such as a mobile phone, that can be used with a touch sensor having encoded and decoded touch signals according to various examples. FIG. 10 illustrates yet another exemplary personal device 1000, such as a portable media player, that can be used with a touch sensor having encoded and decoded touch signals according to various examples. FIG. 11 illustrates another exemplary personal device 1100, such as a laptop computer, that can be used with a touch sensor having encoded and decoded touch signals according to various examples.

Therefore, according to the above, some examples of the disclosure are directed to a system comprising a sense amplifier comprising a positive terminal and a negative terminal; switching circuitry for receiving a plurality of touch signals from a plurality of sense electrodes of a touch sensor panel, wherein the switching circuitry is operable to selectively couple each of the plurality of sense electrodes to the positive terminal of the sense amplifier or the negative terminal of the sense amplifier based on a matrix; an analog-to-digital converter coupled to receive an output of the sense amplifier; and decoding circuitry coupled to receive an output of the analog-to-digital converter, wherein the decoding circuitry is operable to decode the output of the analog-to-digital converter using an inverse of the matrix to generate a plurality of output signals that are representative of the plurality of touch signals. Additionally or alternatively to one or more of the examples disclosed above, in some examples, the switching circuitry comprises a plurality of switches, and wherein each of the plurality of switches is coupled to one of the plurality of sense electrodes. Additionally or alternatively to one or more of the examples disclosed above, in some examples, the system can further include a touch sensor panel comprising: a plurality of drive electrodes; and a plurality of sense electrodes capacitively coupled to the plurality of drive electrodes; and drive circuitry operable to stimulate the plurality of drive electrodes of the touch sensor panel with a plurality of stimulation signals. Additionally or alternatively to one or more of the examples disclosed above, in some examples, a number of columns of the matrix is equal to a number of the plurality of sense electrodes of the touch sensor panel, and wherein a number of rows of the matrix is equal to a number of the plurality of drive electrodes of the touch sensor panel. Additionally or alternatively to one or more of the examples disclosed above, in some examples, the drive circuitry is operable to modulate the plurality of stimulation signals using a single-stim technique, multi-stim technique, or an orthogonal frequency scan technique. Additionally or alternatively to one or more of the examples disclosed above, in some examples, the system can further include demodulation circuitry coupled to receive the plurality of output signals from the decoding circuitry, wherein the demodulation circuitry is operable to demodulate the plurality of output signals based on the modulation used by the drive circuitry. Additionally or alternatively to one or more of the examples disclosed above, in some examples, the matrix comprises a Hadamard Matrix, Circulant Matrix, or an Identity Matrix.

Some examples of the disclosure are directed to a system comprising: a touch sensor panel, the touch sensor panel comprising: a plurality of drive electrodes; and a plurality of sense electrodes capacitively coupled to the plurality of drive electrodes; a sense amplifier comprising a positive terminal and a negative terminal; a plurality of switches for receiving a plurality of touch signals from the plurality of sense electrodes, wherein the plurality of switches are operable to individually couple each of the plurality of touch signals to the positive terminal of the sense amplifier or the negative terminal of the sense amplifier based on a matrix; an analog-to-digital converter coupled to receive an output of the sense amplifier; and decoding circuitry coupled to receive an output of the analog-to-digital converter, wherein the decoding circuitry is operable to decode the output of the analog-to-digital converter using an inverse of the matrix to generate a plurality of output signals that are representative of the plurality of touch signals. Additionally or alternatively to one or more of the examples disclosed above, in some examples, the system is included within a mobile phone, portable media player, tablet computer, or laptop computer. Additionally or alternatively to one or more of the examples disclosed above, in some examples, the decoding circuitry comprises a plurality of multipliers, and wherein each of the plurality of multipliers is operable to multiply the output of the analog-to-digital converter by a different column of the inverse of the matrix. Additionally or alternatively to one or more of the examples disclosed above, in some examples, the matrix comprises a Hadamard Matrix, Circulant Matrix, or an Identity Matrix. Additionally or alternatively to one or more of the examples disclosed above, in some examples, the plurality of switches are operable to individually couple each of the plurality of touch signals to the positive terminal of the sense amplifier or the negative terminal of the sense amplifier based on values of the elements contained in the matrix.

Some examples of the disclosure are directed to a system comprising: a receiving channel operable to receive a plurality of touch signals and apply a matrix to the plurality of touch signals to generate an encoded signal; an analog-to-digital converter coupled to receive the encoded signal; and decoding circuitry coupled to receive an output of the analog-to-digital converter, wherein the decoding circuitry is operable to decode the output of the analog-to-digital converter using an inverse of the matrix to generate a plurality of output signals that are representative of the plurality of touch signals. Additionally or alternatively to one or more of the examples disclosed above, in some examples, the receiving channel comprises: a sense amplifier comprising a positive terminal and a negative terminal; and a plurality of switches, wherein each of the plurality of switches is coupled to receive one of the plurality of touch signals, and wherein the plurality of switches are operable to selectively couple each of the touch signals to the positive terminal of the sense amplifier or the negative terminal of the sense amplifier based on the matrix. Additionally or alternatively to one or more of the examples disclosed above, in some examples, the system can further include a touch sensor panel comprising: a plurality of drive electrodes; and a plurality of sense electrodes capacitively coupled to the plurality of drive electrodes; and drive circuitry coupled to the plurality of drive electrodes and operable to drive the plurality of drive electrodes with a plurality of stimulation signals, wherein the plurality of sense electrodes are operable to generate the plurality of touch signals in response to the plurality of drive electrodes being driven by the plurality of stimulation signals. Additionally or alternatively to one or more of the examples disclosed above, in some examples, the decoding circuitry comprises a plurality of multipliers, and wherein each of the plurality of multipliers is operable to multiply the output of the analog-to-digital converter by a different column of the inverse of the matrix.

Some examples of the disclosure are directed to a method comprising: stimulating a plurality of drive electrodes with a plurality of stimulation signals; receiving a plurality of touch signals generated in response to the plurality of stimulation signals; encoding the plurality of touch signals using a matrix; amplifying the encoded plurality of touch signals; converting the encoded plurality of touch signals into a digital signal; and decoding the plurality of touch signals from the digital signal using an inverse of the matrix. Additionally or alternatively to one or more of the examples disclosed above, in some examples, the method can further include modulating the plurality of stimulation signals using a single-stim technique, multi-stim technique, or an orthogonal frequency scan technique. Additionally or alternatively to one or more of the examples disclosed above, in some examples, the method can further include demodulating the decoded plurality of touch signals based on the modulation of the plurality of stimulation signals. Additionally or alternatively to one or more of the examples disclosed above, in some examples, encoding the plurality of touch signals using the matrix comprises selectively coupling each of the plurality of touch signals to a positive terminal of a sense amplifier or a negative terminal of the sense amplifier based on the matrix. Additionally or alternatively to one or more of the examples disclosed above, in some examples, decoding the plurality of touch signals using the matrix comprises multiplying the digital signal by each column of the inverse of the matrix. Additionally or alternatively to one or more of the examples disclosed above, in some examples, the matrix comprises a Hadamard Matrix, Circulant Matrix, or an Identity Matrix. Additionally or alternatively to one or more of the examples disclosed above, in some examples, the touch signals are received from a touch sensor comprising a plurality of drive electrodes and a plurality of sense electrodes capacitively coupled to the plurality of drive electrodes. Additionally or alternatively to one or more of the examples disclosed above, in some examples, a number of columns of the matrix is equal to a number of the plurality of sense electrodes of the touch sensor panel, and wherein a number of rows of the matrix is equal to a number of the plurality of drive electrodes of the touch sensor panel.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A system comprising:
a sense amplifier comprising a positive terminal and a negative terminal;
switching circuitry for receiving a plurality of touch signals from a plurality of sense electrodes of a touch sensor panel, wherein the switching circuitry is operable to selectively couple each of the plurality of sense electrodes to the positive terminal of the sense amplifier or the negative terminal of the sense amplifier based on a matrix;
an analog-to-digital converter coupled to receive an output of the sense amplifier; and
decoding circuitry coupled to receive an output of the analog-to-digital converter, wherein the decoding circuitry is operable to decode the output of the analog-to-digital converter using an inverse of the matrix to generate a plurality of output signals that are representative of the plurality of touch signals.

2. The system of claim 1, wherein the switching circuitry comprises a plurality of switches, and wherein each of the plurality of switches is coupled to one of the plurality of sense electrodes.

3. The system of claim 1, further comprising the touch sensor panel communicatively coupled to the switching circuitry,
the touch sensor panel comprising:
a plurality of drive electrodes; and
the plurality of sense electrodes capacitively coupled to the plurality of drive electrodes;
wherein the system further comprises drive circuitry communicatively coupled to the touch sensor panel and operable to stimulate the plurality of drive electrodes of the touch sensor panel with a plurality of stimulation signals.

4. The system of claim 3, wherein a number of columns of the matrix is equal to a number of the plurality of sense electrodes of the touch sensor panel, and wherein a number of rows of the matrix is equal to a number of the plurality of drive electrodes of the touch sensor panel.

5. The system of claim 3, wherein the drive circuitry is operable to modulate the plurality of stimulation signals using a single-stim technique, multi-stim technique, or an orthogonal frequency scan technique.

6. The system of claim 5, further comprising demodulation circuitry coupled to receive the plurality of output signals from the decoding circuitry, wherein the demodulation circuitry is operable to demodulate the plurality of output signals based on the modulation used by the drive circuitry.

7. The system of claim 1, wherein the matrix comprises a Hadamard Matrix, Circulant Matrix, or an Identity Matrix.

8. A system comprising:
a touch sensor panel, the touch sensor panel comprising:
a plurality of drive electrodes; and
a plurality of sense electrodes capacitively coupled to the plurality of drive electrodes;
a sense amplifier comprising a positive terminal and a negative terminal;
a plurality of switches for receiving a plurality of touch signals from the plurality of sense electrodes, wherein the plurality of switches are operable to individually couple each of the plurality of touch signals to the positive terminal of the sense amplifier or the negative terminal of the sense amplifier based on a matrix;
an analog-to-digital converter coupled to receive an output of the sense amplifier; and
decoding circuitry coupled to receive an output of the analog-to-digital converter, wherein the decoding circuitry is operable to decode the output of the analog-to-digital converter using an inverse of the matrix to generate a plurality of output signals that are representative of the plurality of touch signals.

9. The system of claim 8, wherein the system is included within a mobile phone, portable media player, tablet computer, or laptop computer.

10. The system of claim 8, wherein the decoding circuitry comprises a plurality of multipliers, and wherein each of the plurality of multipliers is operable to multiply the output of the analog-to-digital converter by a different column of the inverse of the matrix.

11. The system of claim 8, wherein the matrix comprises a Hadamard Matrix, Circulant Matrix, or an Identity Matrix.

12. The system of claim 8, wherein the plurality of switches are operable to individually couple each of the plurality of touch signals to the positive terminal of the sense amplifier or the negative terminal of the sense amplifier based on values of the elements contained in the matrix.

13. A system comprising:
a receiving channel operable to receive a plurality of touch signals and apply a plurality of values to the plurality of touch signals to generate an encoded signal;
an analog-to-digital converter coupled to receive the encoded signal; and
decoding circuitry coupled to receive an output of the analog-to-digital converter, wherein the decoding circuitry is operable to decode the output of the analog-to-digital converter using an inverse of the plurality of values to generate a plurality of output signals that are representative of the plurality of touch signals.

14. The system of claim 13, wherein the receiving channel comprises:
a sense amplifier comprising a positive terminal and a negative terminal; and
a plurality of switches, wherein each of the plurality of switches is coupled to receive one of the plurality of touch signals, and wherein the plurality of switches are operable to selectively couple each of the touch signals to the positive terminal of the sense amplifier or the negative terminal of the sense amplifier based on the plurality of values.

15. The system of claim 13, further comprising:
a touch sensor panel communicatively coupled to the receiving channel, the touch sensor panel comprising:
a plurality of drive electrodes; and
a plurality of sense electrodes capacitively coupled to the plurality of drive electrodes; and
drive circuitry coupled to the plurality of drive electrodes and operable to drive the plurality of drive electrodes with a plurality of stimulation signals, wherein the plurality of sense electrodes are operable to generate the plurality of touch signals in response to the plurality of drive electrodes being driven by the plurality of stimulation signals.

16. The system of claim 13, wherein the decoding circuitry comprises a plurality of multipliers, and wherein each of the plurality of multipliers is operable to multiply the output of the analog-to-digital converter by a different subset of the inverse of the plurality of values.

17. A method comprising:
stimulating a plurality of drive electrodes with a plurality of stimulation signals;
receiving a plurality of touch signals generated in response to the plurality of stimulation signals;
encoding the plurality of touch signals using a plurality of values;
amplifying the encoded plurality of touch signals;
converting the encoded plurality of touch signals in to a digital signal; and
decoding the plurality of touch signals from the digital signal using an inverse of the plurality of values.

18. The method of claim 17, further comprising modulating the plurality of stimulation signals using a single-stim technique, multi-stim technique, or an orthogonal frequency scan technique.

19. The method of claim 18, wherein the method further comprises demodulating the decoded plurality of touch signals based on the modulation of the plurality of stimulation signals.

20. The method of claim 17, wherein encoding the plurality of touch signals using the plurality of values comprises selectively coupling each of the plurality of touch signals to a positive terminal of a sense amplifier or a negative terminal of the sense amplifier based on the plurality of values.

21. The method of claim 17, wherein decoding the plurality of touch signals using the inverse of the plurality of values comprises multiplying the digital signal by each of a plurality of subsets of the inverse of the plurality of values.

22. The method of claim 17, wherein the plurality of values, when represented as a matrix, form a Hadamard Matrix, Circulant Matrix, or an Identity Matrix.

23. The method of claim 17, wherein the touch signals are received from a touch sensor panel comprising a plurality of drive electrodes and a plurality of sense electrodes capacitively coupled to the plurality of drive electrodes.

24. The method of claim 23, wherein when the plurality of values is represented as a matrix, a number of columns of the matrix is equal to a number of the plurality of sense electrodes of the touch sensor panel and a number of rows of the matrix is equal to a number of the plurality of drive electrodes of the touch sensor panel.

* * * * *